US008949220B2

(12) United States Patent
Liu et al.

(10) Patent No.: US 8,949,220 B2
(45) Date of Patent: Feb. 3, 2015

(54) TECHNIQUES FOR MANAGING XML DATA ASSOCIATED WITH MULTIPLE EXECUTION UNITS

(75) Inventors: Zhen Liu, San Mateo, CA (US); Muralidhar Krishnaprasad, Fremont, CA (US); Anand Manikutty, Foster City, CA (US); Ravi Murthy, Fremont, CA (US); James Warner, Mountain View, CA (US); Thomas H. Chang, Redwood Shores, CA (US); Vikas Arora, San Francisco, CA (US); Susan Kotsovolos, San Carlos, CA (US)

(73) Assignee: Oracle International Corporation, Redwood Shores, CA (US)

( * ) Notice: Subject to any disclaimer, the term of this patent is extended or adjusted under 35 U.S.C. 154(b) by 2002 days.

(21) Appl. No.: 10/810,152

(22) Filed: Mar. 26, 2004

(65) Prior Publication Data
US 2005/0138047 A1    Jun. 23, 2005

Related U.S. Application Data

(60) Provisional application No. 60/531,449, filed on Dec. 19, 2003.

(51) Int. Cl.
*G06F 17/30*    (2006.01)
*G06F 7/00*    (2006.01)

(52) U.S. Cl.
CPC .................................. *G06F 17/3092* (2013.01)
USPC ............................. 707/718; 707/719; 707/804

(58) Field of Classification Search
USPC ............ 707/1–10, 100–104.1, 200–205, 718, 707/804, 719
See application file for complete search history.

(56) References Cited

U.S. PATENT DOCUMENTS

| | | | | |
|---|---|---|---|---|
| 6,643,652 | B2 * | 11/2003 | Helgeson et al. | 707/10 |
| 6,721,747 | B2 * | 4/2004 | Lipkin | 707/10 |
| 6,785,673 | B1 * | 8/2004 | Fernandez et al. | 707/3 |
| 7,103,590 | B1 * | 9/2006 | Murthy et al. | 707/3 |
| 2002/0073236 | A1 * | 6/2002 | Helgeson et al. | 709/246 |
| 2003/0065659 | A1 | 4/2003 | Agarwal et al. | |
| 2003/0126136 | A1 * | 7/2003 | Omoigui | 707/10 |
| 2003/0140308 | A1 | 7/2003 | Murthy et al. | |
| 2003/0167277 | A1 | 9/2003 | Hejlsberg et al. | |

(Continued)

OTHER PUBLICATIONS

Josephine Cheng, et al., "IBM DB2 XML Extender, An end-to-end solution for storing and retrieving XML documents," IEEE, ICDE '00 Conference, San Diego, Feb. 2000, 128 pages.

(Continued)

*Primary Examiner* — Hosain Alam
*Assistant Examiner* — Navneet K Ahluwalia
(74) *Attorney, Agent, or Firm* — Hickman Palermo Truong Becker Bingham Wong LLP (57) ABSTRACT

Techniques for managing XML data associated with multiple execution units ensure that execution units are able to use XML data coming from other execution units. Such techniques are applicable when, but for the technique, an XML type value is produced in a particular form by one execution unit and is supposed to be consumed by another execution unit that is unable to process data in the particular form, and involves detecting that the foregoing situation exists and annotating information sent to an XML producer execution unit to cause the XML type value to be transformed into a canonical form that can be shared by all relevant execution units.

44 Claims, 2 Drawing Sheets

(56) References Cited

U.S. PATENT DOCUMENTS

| | | | |
|---|---|---|---|
| 2003/0226111 A1 | 12/2003 | Wirts et al. | |
| 2003/0229529 A1* | 12/2003 | Mui et al. | 705/8 |
| 2004/0177080 A1 | 9/2004 | Doise et al. | |
| 2004/0220946 A1 | 11/2004 | Krishnaprasad et al. | |
| 2004/0255046 A1 | 12/2004 | Ringseth et al. | |
| 2004/0267760 A1 | 12/2004 | Brundage et al. | |
| 2006/0248045 A1* | 11/2006 | Toledano et al. | 707/2 |

OTHER PUBLICATIONS

Jim Melton, "ISO-ANSI Working Draft, XML-Related Specifications.(SQL/XML)," WG3: DRS-020, H2-2002-365, Aug. 2002, 154 pages.

Oracle Corporation, "Oracle9i XML Database Developer's Guide—Oracle XML DB," Release 2 (9.2), Mar. 2002, Part No. A96620-1, pp. 5-8-5-10, 5-21-5-24 and 5-32-5-52.

W3C, "XML Schema Part 1: Structures," W3C Recommendation, May 2, 2001, http://www.w3.org/TR/2001/REC-xmlschema-1-20010502/, pp. 1-186.

W3C, "XML Schema Part 2: Datatypes," W3C Recommendation, May 2, 2001, http://www.w3.org/TR/2001/REC-xmlschema-2-20010502/, pp. 1-138.

Mark Drake et al., Oracle Corporation, "Understanding the Oracle9i XML Type," Nov. 1, 2001, http://otn.oracle.com/oramag/oracle/01-nov/o61xml.html?_template=/ocom/technology, data retrieved Jun. 29, 2004, pp. 1-5.

Johnathan Gennick, Oracle Corporation, "SQL in, XML out," May 1, 2003, http://otn.oracle.com/oramag/oracle/03-may/o33xml.html?_template=/ocom/technology, data retrieved Jun. 29, 2004, pp. 1-4.

Shelley Higgins, Oracle Corporation, "Oracle9i, Case Studies—XML Applications," Release 1 (9.0.1), Jun. 2001, Part No. A88895-01, pp. 1-462 (text provided on CD-ROM).

Shelley Higgins, Oracle Corporation, "Oracle9i, Application Developer's Guide—XML," Release 1 (9.0.1), Jun. 2001, Part No. A88894-01, pp. 1-1,362 (text provided on CD-ROM).

Oracle Corporation, "Oracle9i Application Server, Administrator's Guide," Release 2 (9.0.2), May 2002, Part No. A92171-02, Part No. A92171-02, pp. 1-392 (text provided on CD-ROM).

U.S. Appl. No. 11/100,083, filed Apr. 5, 2005, Office Action, Nov. 27, 2013.

* cited by examiner

TECHNIQUES FOR MANAGING XML DATA ASSOCIATED WITH MULTIPLE EXECUTION UNITS

CROSS REFERENCE TO RELATED APPLICATIONS

This application claims the benefit of priority to U.S. Provisional Patent Application No. 60/531,449 entitled "Techniques for Parallel Execution of XML Type Operators, Methods, Functions and SQL/XML Publishing Function," filed on Dec. 19, 2003; which is incorporated by reference in its entirety for all purposes as if fully set forth herein.

FIELD OF THE INVENTION

The present invention relates generally to information systems and, more specifically, to techniques for managing XML data associated with multiple execution units.

BACKGROUND OF THE INVENTION

With support for XML type data as a native data type in information management systems, such as a relational database system (RDBMS) or object-relational database system (ORDBMS), users can store contents of XML documents in such systems. For example, in the context of a relational database, XML data may be stored in columns of a relational table. Users can invoke XML type operators or methods to query the XML data via a SQL query. However, there is an inherent scalability problem with such queries when the number of XML documents stored in such tables increases, in that the queries take too long to process. The same scalability problem also exists when using SQL/XML publishing functions, such as XMLELEMENT and XMLAGG, in a query to construct XML from data stored in the relational table.

Although relational database systems often include a parallel query (PQ) execution framework to address the SQL query scalability issue, such a framework cannot be applied to XML type operators, methods, SQL/XML publishing functions, XML-based user-defined functions, and the like, because XML type values conventionally returned by such operators, methods and functions may contain execution unit-specific information that is not sharable among other parallel execution units that may be working to service a common request. Hence, prior technologies offer no effective solution to address the scalability issue that exists with queries that manipulate XML data on a relatively large scale, even when users can add additional hardware resources to the system, for example, additional CPUs, additional memory and additional nodes to a computing cluster or grid.

Consequently, the burden is shifted to applications, which are required to include non-trivial code to deal with the scalability issue. For example, an application may have to open multiple database connections and run multiple XML type queries concurrently, and then merge those query results inside the application.

Based on the foregoing, it is desirable to provide a technique for servicing information requests associated with XML data that are serviced by multiple execution units.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION

Techniques are described for managing XML data associated with multiple execution units. The term "execution units" is used to generally describe, for non-limiting examples, operating system processes, threads within a process, or processes executing on different nodes in a distributed computing environment.

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

Overview

A technique for managing XML data associated with multiple execution units, so that "consumer" execution units are ensured the ability to use XML data coming from other "producer" execution units, is described. Such a technique is applicable when, but for the described technique, (1) an XML type value would be produced in a particular form by one execution unit and (2) the value is supposed to be used, or consumed, by another execution unit that is unable to process data in that particular form. In general, such a technique involves transforming the XML type value into a canonical form that can be shared by all relevant execution units.

According to one embodiment, it is detected that work that will be performed by a first execution unit will cause the first execution unit to generate XML data for use by a second execution unit. Information is generated for causing the first execution unit to perform some work, where the information is annotated to cause transformation of XML data that is generated by the first execution unit to a canonical form that is useable by the second execution unit. For example, a database query optimizer, in building a query plan, detects that the first execution unit would produce XML data that includes pointers to memory that is exclusive to the first execution unit. Therefore, the optimizer sends SQL statements to the first execution unit for execution, where the execution of the SQL statements causes the first execution unit to transform its typical output to a canonical XML form that can be used by a consumer execution unit, before passing the output to the consumer execution unit.

Examples of canonical forms to which various XML type values may be converted include simple alphanumeric text/characters, serialized data values representing a particular XML construct, and a compressed form; or the XML type values may include a reference, such as a logical pointer, to a memory location in persistent storage. The canonical form used may vary from implementation to implementation, and may be relative to the context of the XML processing being performed and the capability of the available computing resources.

In one implementation context, the techniques enable database users to invoke XML type operators, methods, functions, etc., to query XML documents that are stored natively in a database system, using a parallel-executing SQL query that includes resource-intensive XML operations. Non-limiting examples of such XML type operators, methods and functions include SQL/XML publishing functions, such as XMLElement( ), XMLForest( ), XMLConcat( ); XML querying operators, such as extract( ), extractValue( ), existsNode( ), xmlIsValid( ); and user defined functions returning XML types. Hence, scalability challenges are overcome, with respect to querying potentially massive XML documents stored in a data source. Furthermore, the techniques may be utilized, for non-limiting examples, by a mid-tier application that spawns worker threads to process XML data from a database or other data sources; for the management of XML data-related workload that is spread across multiple database servers, such as with a distributed database; and for the aggregate processing of XML type aggregate operators, such as XMLAGG.

Multiple XML Type Data Forms

XML type data, which may be represented as image payloads, are designed to be multi-formed to perform efficiently for different environments. The techniques described herein are applicable in any contexts or systems in which XML type data can take any of a number of forms. XML serialization forms represent data for XML constructs as a series of data units, such as a series of bytes representing characters or bits, bytes or octets representing binary values. An image can be generated that includes a payload and a payload type field, where the payload includes particular serialized data that represents particular data for a particular XML construct in the selected form. The type field includes data that indicates the selected form.

U.S. patent application Ser. No. 10/428,393 entitled "Techniques for Transferring A Serialized Image of XML Data" is incorporated by reference in its entirety for all purposes as if fully set forth herein. The reference describes several XML serialization forms. In addition, new serialization forms may be developed in the future and used with embodiments of the present invention. As described therein, a serialized image is constructed from serialized data by adding other information employed to use the serialized data after it is sent, such as length of the serialized data and information about how the serialized data is generated. Furthermore, the reference describes a combination of fields that composes a serialized image of XML data.

Parallel and Distributed Processing

Often, servicing a request such as a database query or, generally, any request for information, is facilitated by distributing work across multiple execution units, such as according to a parallel query (PQ) framework implemented in a database server, or across a distributed database. For example, a PQ execution engine can spawn multiple worker execution units, each of which processes one partition of a database table which necessitates executing XMLType operators, such as existsNode, xmlIsValid and xmlTransform, in parallel. A PQ coordinator execution unit can then take the XMLType values sent from each execution unit, aggregate the values, and send them to the requesting client. Since XML operators such as XMLIsValid and XMLTransform are CPU intensive, parallel execution improves the performance of the query in relation to serial execution.

Many practical computational contexts rely on distribution of work across multiple execution units. In addition to parallel execution of a database query in which each participating worker execution unit executes the query on an assigned portion of the relevant data, as previously described, another example implementation context is where each participating worker execution unit executes a portion of a larger query according to an overall query plan, where passing of XML data occurs among the participating worker execution units. Another example of an implementation context is where XML documents are stored in tables that are partitioned, where different groups of rows may be processed by different database management server instances and/or stored on different physical memory mechanisms (e.g., disk drives). Yet another example of an implementation context is where execution of XML type aggregate operators may rely on a particular aggregator execution unit to aggregate XML data values that are provided by other worker execution units.

However, in the foregoing scenarios, without a technique for passing XML type values in a canonical form among parallel or distributed execution units, often work cannot be executed by parallel or distributed execution units because the XML type values generated by each execution unit may contain execution unit-specific data that is not sharable by other execution units, including the PQ coordinator execution unit. For example, because XML documents are often quite large and the XML data has associated context, a given execution unit that is working with XML data may rely heavily on temporary storage of XML data in, and pointers to, execution unit-specific memory rather than loading vast amounts of XML data into shared main memory. Hence, in embodiments, XML image payloads generated by various execution units are transformed into a canonical form so that the payloads are sharable among PQ and/or distributed execution units. In a canonical form, the image representation of the XML data type values does not contain any references to the execution unit-specific data that is not accessible by other execution units.

Database Query Optimizer

A query optimizer is a component of a database server that generates an execution plan to execute queries received by the database server. An execution plan defines the steps and operations performed by a database server to process a query. A query optimizer generates execution plans that are optimized for efficiency. When determining what steps to include in an execution plan, and the order in which the steps are performed, a query optimizer accounts for many factors that affect efficiency.

To determine an efficient execution plan for a query, a cost-based query optimizer typically relies on persistently stored table statistics to estimate the costs of alternative execution plans, and chooses the plan with the lowest estimated cost. Table statistics are used to estimate important optimizer cost parameters such as the selectivity of predicates and predicate clauses (i.e., the fraction or percentage of rows in a table that match some condition). Examples of table statistics include table cardinalities (the number of rows in a table), the number of distinct values for a column, the minimum and maximum value in the column, and histograms, which is data that specifies the distribution of values in the columns, i.e., the number of rows that have particular column values for a column or the number of rows that have a column value that falls within a range.

Method for Processing XML Type Data

Figure 1:
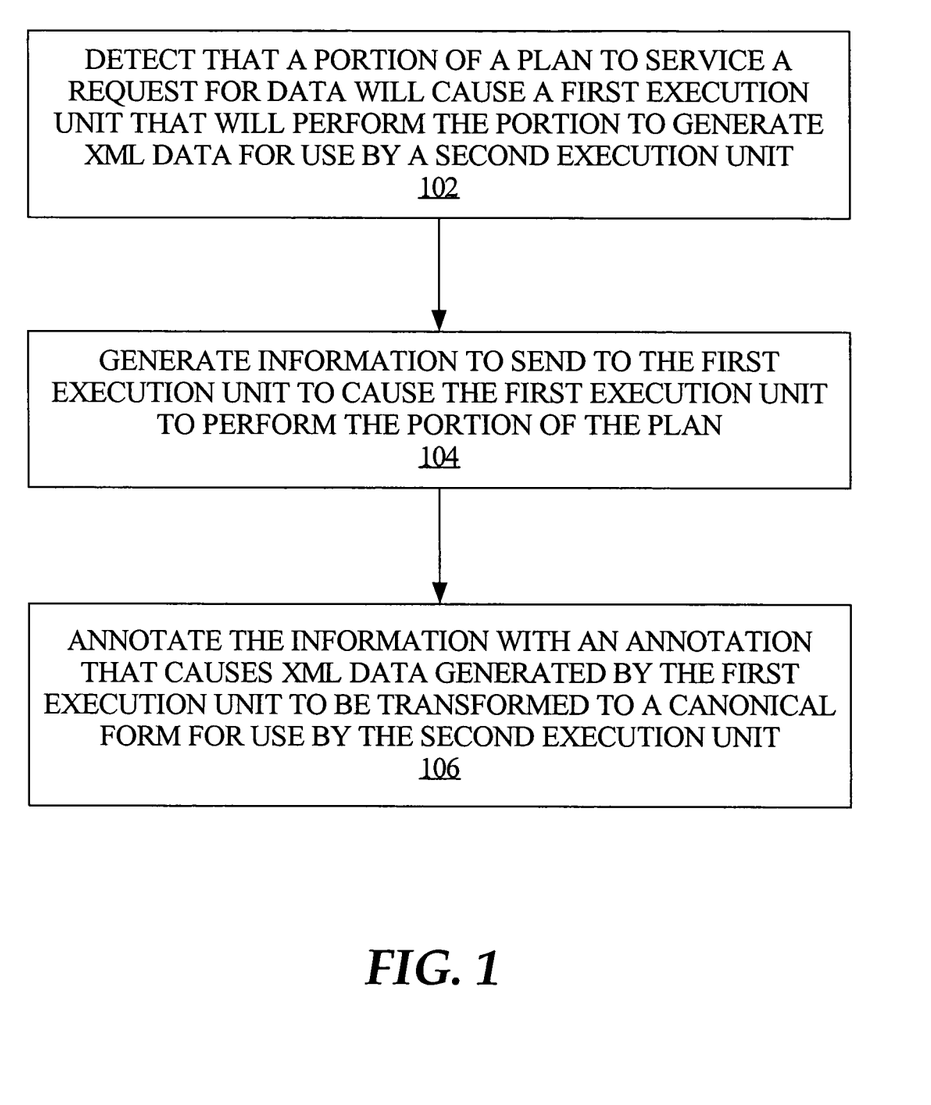
FIG. 1 is a flow diagram that illustrates a method for processing XML data, according to an embodiment of the invention.

FIG. 1 is a flow diagram that illustrates a method for processing XML data, according to an embodiment of the invention. The mechanism or means that performs the method of FIG. 1 can vary from implementation to implementation. Generally, the technique embodied in the method illustrated in FIG. 1 is applicable to any context in which multiple execution units are executing work and exchanging XML data that may be in one of multiple different forms.

For example, any software application or module that integrates and/or coordinates services hosted by multiple data sources (e.g., a database, a web service, a web site, and the like), which requires performance of work by multiple execution units, operators or functions that produce XML type information, may perform the method of FIG. 1.

For another example, in the context of parallel query framework, the method may be performed by a query coordinator or optimizer that coordinates the distribution of, and may summarize the results of, work across multiple execution units that execute in parallel.

For another example, in the context of a distributed database (sometimes referred to as a database cluster environment), the method may be performed by a query optimizer that analyzes a query request, builds a query plan, and coordinates execution of the plan among multiple database server instances in the cluster; and/or the method may be performed at some level by one or more of the database server instances, when coordinating the execution of the work assigned to a respective instance.

At block 102, it is detected that a portion of a plan to service a request for data will cause a first execution unit that will perform the portion to generate XML data for use by a second execution unit. For example, during the formation of a query execution plan (sometimes referred to as a "query tree") in response to reception of a user query, a database query optimizer or coordinator detects that one execution unit, in executing the plan, would produce XML type data for consumption by another execution unit.

At block 104, information is generated for sending to the first execution unit to cause the first execution unit to perform the portion of the plan. In one embodiment, the information generated for sending to the execution unit is one or more database commands, such as SQL fragments. In another embodiment, the information generated for sending to the execution unit is a query execution plan, from which the first execution unit can execute its respective portion of the plan that is specified in the plan.

At block 106, the information is annotated with an annotation that causes XML data generated by the first execution unit to be transformed into a canonical form for use by the second execution unit. In an embodiment, the canonical form is canonical in the sense that all execution units that will execute a portion of the plan are able to use the data in such form. Therefore, the canonical form represents the XML data payload in a "sharable" form among multiple execution units.

In one embodiment, the annotation is an operator that causes the XML data to be transformed. Furthermore, the annotation may include arguments for the operator, which contribute to sufficiently specifying the canonical form such that the data can be transformed. In one embodiment, it is the first execution unit, when processing the information, that performs the transformation of the XML data that is generated by the first execution unit to the canonical form.

In one embodiment, the step of generating at block 104 includes generating information that, prior to annotating at block 106, would cause the first execution unit to generate XML data in a form that cannot be used by the second execution unit. Returning to the example in which a query plan is generated, the query optimizer recognizes that but for the annotation the first execution unit would produce XML data that needs to be passed on to a second execution unit for consumption, but that the second execution unit does not understand or cannot use the data in its typical, non-transformed form. Examples of possible incompatible forms are previously described herein.

Canonical Forms

In an embodiment, the canonical form is determined from information that describes preferences of each of multiple worker execution units that perform work associated with servicing the request. The determination of which of one or more XML serialization forms to embody in the canonical form may be based on any factors and may vary from implementation to implementation. In one embodiment, the determination is made based on the capabilities of the receiving or consuming execution units, which are described in a preferences list. The preference list includes data that indicates the serialization forms that can be used and understood by an execution unit source, such as an application server, application client or database client. Refer to U.S. patent application Ser. No. 10/428,393 for a description of preference lists.

In general, any given canonical form that is used is based on the context of its use. The canonical form is a form that all participating consumer execution units can understand and use. Non-limiting examples of canonical forms that may be utilized in various implementations include (1) serialization of the entire XML data produced by a given execution unit to represent the data according to a particular XML construct and insertion of the serialized data into the payload portion of an output image; (2) identification of shared memory space where representations of XML data produced by the given execution unit are persistently stored, such as a pointer to data items in a relational table of a database which is accessible by all relevant consumer execution units; and (3) compression of the XML data produced by the given execution unit according to a particular compression form that the relevant consumer execution units are able to decompress.

The "first execution unit" referenced in the method of FIG. 1, e.g., an execution unit that is acting as an XML producer execution unit, receives the information that is annotated with some form of specification of the canonical form to which the XML data generated by the producer execution unit is to be transformed. The XML type data values remain the same before and after such transformation, rather it is only the form of such XML type data values that are transformed for use by another execution unit. Thus, the nature of the transformation of the form of the XML type data values is different than what can be accomplished with an XSLT stylesheet, which is used to describe how to transform a source tree or data structure of an XML document into the result tree for a new XML document and is usually relative to the presentation of the data to a user. Transformations of XML type data values according to the canonical form as described herein are not transforming the data tree structure and how the data is to be presented, rather such transformation are changing the form of the XML type data values so that other execution units can access and/or understand the data values.

Producer Execution Unit Response to Reception of Annotated Information

In an embodiment, a worker execution unit acting in the context of an XML producer execution unit, e.g., the "first execution unit" of the method of FIG. 1, receives the annotated information that includes the transformation annotation. In the scenario in which the annotation is an operator, the producer execution unit executes the operator to transform XML data generated by the producer execution unit into the specified canonical form, for use by one or more other execution units. The transformed XML data is then sent to an execution unit acting in the context of an XML consumer execution unit, e.g., the "second execution unit" of the method of FIG. 1, for example, as the payload of a serialized XML image. The consumer execution unit receives an image having XML data transformed by the producer execution unit according to the canonical form and, therefore, the consumer execution unit is ensured that it can access and understand the XML type data values represented in the image.

The described techniques enable parallel and/or distributed execution of XML type operators, methods and functions, thereby enabling application users to query XML data and publish XML data efficiently, and to scale the performance of such actions to meet the requirements of ever increasing volumes of XML data.

Hardware Overview

Figure 2:
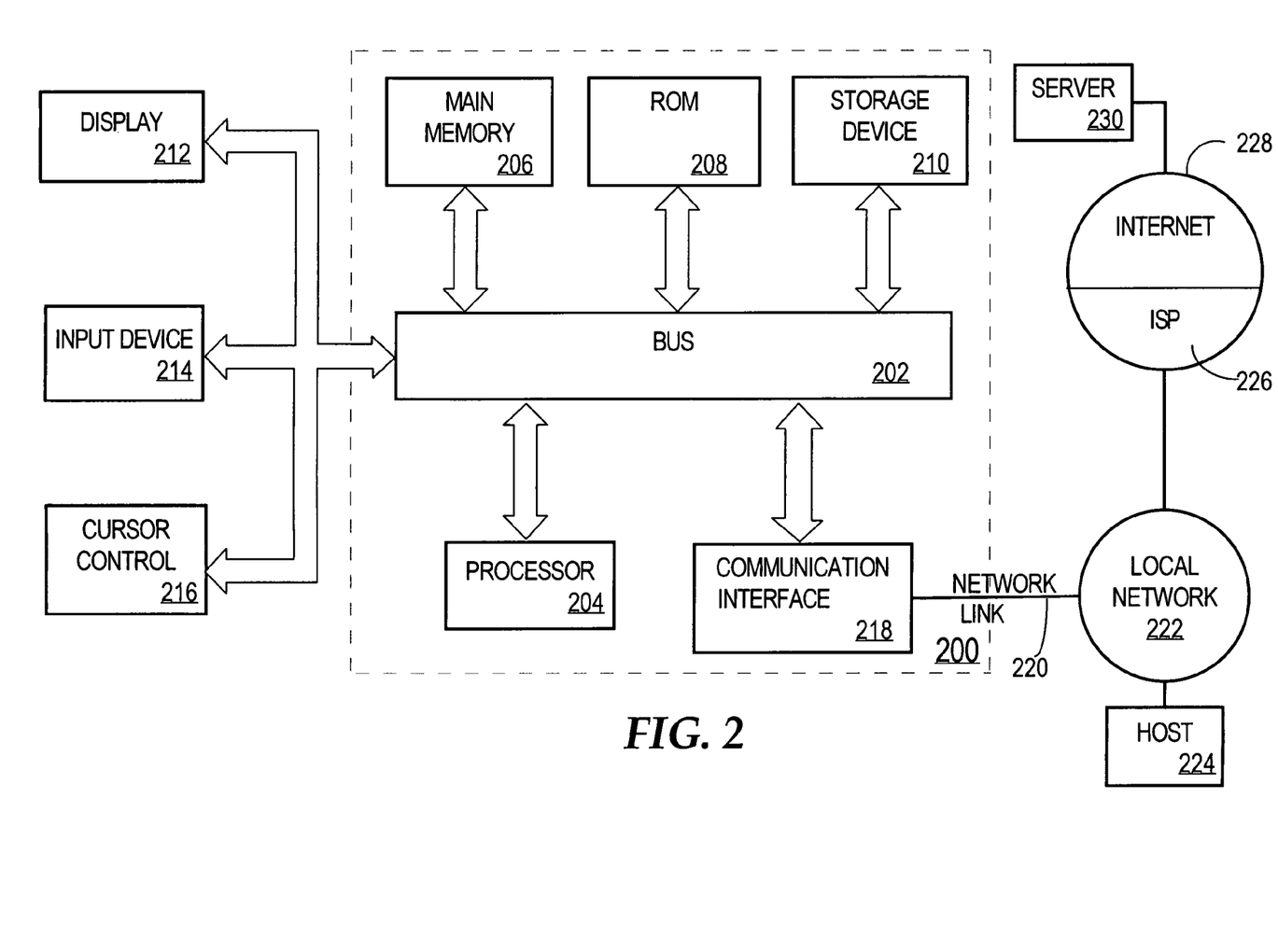
FIG. 2 is a block diagram that illustrates a computer system upon which an embodiment of the invention may be implemented.

FIG. 2 is a block diagram that illustrates a computer system 200 upon which an embodiment of the invention may be implemented. Computer system 200 includes a bus 202 or other communication mechanism for communicating information, and a processor 204 coupled with bus 202 for processing information. Computer system 200 also includes a main memory 206, such as a random access memory (RAM) or other dynamic storage device, coupled to bus 202 for storing information and instructions to be executed by processor 204. Main memory 206 also may be used for storing temporary variables or other intermediate information during execution of instructions to be executed by processor 204. Computer system 200 further includes a read only memory (ROM) 208 or other static storage device coupled to bus 202 for storing static information and instructions for processor 204. A storage device 210, such as a magnetic disk, optical disk, or magneto-optical disk, is provided and coupled to bus 202 for storing information and instructions.

Computer system 200 may be coupled via bus 202 to a display 212, such as a cathode ray tube (CRT) or a liquid crystal display (LCD), for displaying information to a computer user. An input device 214, including alphanumeric and other keys, is coupled to bus 202 for communicating information and command selections to processor 204. Another type of user input device is cursor control 216, such as a mouse, a trackball, or cursor direction keys for communicating direction information and command selections to processor 204 and for controlling cursor movement on display 212. This input device typically has two degrees of freedom in two axes, a first axis (e.g., x) and a second axis (e.g., y), that allows the device to specify positions in a plane.

The invention is related to the use of computer system 200 for implementing the techniques described herein. According to one embodiment of the invention, those techniques are performed by computer system 200 in response to processor 204 executing one or more sequences of one or more instructions contained in main memory 206. Such instructions may be read into main memory 206 from another computer-readable medium, such as storage device 210. Execution of the sequences of instructions contained in main memory 206 causes processor 204 to perform the process steps described herein. In alternative embodiments, hard-wired circuitry may be used in place of or in combination with software instructions to implement the invention. Thus, embodiments of the invention are not limited to any specific combination of hardware circuitry and software.

The term "computer-readable medium" as used herein refers to any medium that participates in providing instructions to processor 204 for execution. Such a medium may take many forms, including but not limited to, non-volatile media, volatile media, and transmission media. Non-volatile media includes, for example, optical, magnetic, or magneto-optical disks, such as storage device 210. Volatile media includes dynamic memory, such as main memory 206. Transmission media includes coaxial cables, copper wire and fiber optics, including the wires that comprise bus 202. Transmission media can also take the form of acoustic or light waves, such as those generated during radio-wave and infra-red data communications.

Common forms of computer-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, and EPROM, a FLASH-EPROM, any other memory chip or cartridge, a carrier wave as described hereinafter, or any other medium from which a computer can read.

Various forms of computer readable media may be involved in carrying one or more sequences of one or more instructions to processor 204 for execution. For example, the instructions may initially be carried on a magnetic disk of a remote computer. The remote computer can load the instructions into its dynamic memory and send the instructions over a telephone line using a modem. A modem local to computer system 200 can receive the data on the telephone line and use an infra-red transmitter to convert the data to an infra-red signal. An infra-red detector can receive the data carried in the infra-red signal and appropriate circuitry can place the data on bus 202. Bus 202 carries the data to main memory 206, from which processor 204 retrieves and executes the instructions. The instructions received by main memory 206 may optionally be stored on storage device 210 either before or after execution by processor 204.

Computer system 200 also includes a communication interface 218 coupled to bus 202. Communication interface 218 provides a two-way data communication coupling to a network link 220 that is connected to a local network 222. For example, communication interface 218 may be an integrated services digital network (ISDN) card or a modem to provide a data communication connection to a corresponding type of telephone line. As another example, communication interface 218 may be a local area network (LAN) card to provide a data communication connection to a compatible LAN. Wireless links may also be implemented. In any such implementation, communication interface 218 sends and receives electrical, electromagnetic or optical signals that carry digital data streams representing various types of information.

Network link 220 typically provides data communication through one or more networks to other data devices. For example, network link 220 may provide a connection through local network 222 to a host computer 224 or to data equipment operated by an Internet Service Provider (ISP) 226. ISP 226 in turn provides data communication services through the world wide packet data communication network now commonly referred to as the "Internet" 228. Local network 222 and Internet 228 both use electrical, electromagnetic or optical signals that carry digital data streams. The signals through the various networks and the signals on network link 220 and through communication interface 218, which carry the digital data to and from computer system 200, are exemplary forms of carrier waves transporting the information.

Computer system 200 can send messages and receive data, including program code, through the network(s), network link 220 and communication interface 218. In the Internet example, a server 230 might transmit a requested code for an application program through Internet 228, ISP 226, local network 222 and communication interface 218.

The received code may be executed by processor 204 as it is received, and/or stored in storage device 210, or other non-volatile storage for later execution. In this manner, computer system 200 may obtain application code in the form of a carrier wave.

Extensions and Alternatives

Alternative embodiments of the invention are described throughout the foregoing description, and in locations that best facilitate understanding the context of the embodiments. Furthermore, the invention has been described with reference to specific embodiments thereof. It will, however, be evident that various modifications and changes may be made thereto without departing from the broader spirit and scope of the invention. Therefore, the specification and drawings are, accordingly, to be regarded in an illustrative rather than a restrictive sense.

In addition, in this description certain process steps are set forth in a particular order, and alphabetic and alphanumeric labels may be used to identify certain steps. Unless specifically stated in the description, embodiments of the invention are not necessarily limited to any particular order of carrying out such steps. In particular, the labels are used merely for convenient identification of steps, and are not intended to specify or require a particular order of carrying out such steps.

What is claimed is:

1. A method comprising:
    analyzing a query execution plan that specifies tasks to be performed by a plurality of execution units;
    wherein the plurality of execution units include a first execution unit and a second execution unit;
    wherein the query execution plan is to service a request for data;
    wherein analyzing the query execution plan includes:
        detecting that a portion of the query execution plan specifies first tasks to be performed by the first execution unit;
        detecting that another portion of the query execution plan specifies second tasks to be performed by the second execution unit; and
        detecting that, as a result of performing the first tasks, the first execution unit will generate XML data that the second execution unit needs to perform the second tasks;
    generating information to send to said first execution unit to cause said first execution unit to perform said first tasks;
    wherein, in the absence of any annotation, said information would cause said first execution unit to generate the XML data in a first form that cannot be used by said second execution unit;
    wherein, in said first form, the XML data generated by the first execution unit includes one or more references to execution unit-specific data that is accessible by the first execution unit but that is not accessible by the second execution unit; and
    annotating said information with an annotation that causes the XML data generated by said first execution unit in the first form to be transformed to a second form for use by said second execution unit in performing said second tasks;
    wherein, in said second form, the XML data does not include any references to execution unit-specific data; and
    wherein the method is performed by one or more computing devices.

2. The method of claim 1, wherein the step of generating information includes generating information that, prior to annotating said information, would cause said first execution unit to generate the XML data in said first form that cannot be used by said second execution unit, and wherein said second form is different from said first form.

3. The method of claim 2, wherein said first form includes information to locate data that is stored in memory that is exclusive to said first execution unit, and wherein said information to locate data stored in said memory cannot be used by said second execution unit.

4. The method of claim 1, wherein said request for data is a database query and said query execution plan is a query plan.

5. The method of claim 4, wherein said information is one or more database commands.

6. The method of claim 1, wherein said annotation specifies a transformation operator.

7. The method of claim 6, further comprising:
    executing said transformation operator, by said first execution unit, to transform the XML data generated by said first execution unit to said second form; and
    sending the XML data that is transformed by said first execution unit to said second execution unit in said second form.

8. The method of claim 6, wherein said annotation specifies arguments for said transformation operator, to specify said second form.

9. The method of claim 1, further comprising:
    transforming, by said first execution unit, the XML data to said second form based on said annotation.

10. The method of claim 1, wherein the step of annotating includes annotating said information with an operator to transform the XML data to said second form in which the XML data is serialized to represent particular data for a particular XML construct and is included in a serialized image that is sent to said second execution unit.

11. The method of claim 1, wherein the step of annotating includes annotating said information with an operator to transform the XML data to said second form which includes an identifier of memory space where the XML data is persistently stored, and wherein the XML data in said memory space is accessible by said second execution unit.

12. The method of claim 1, wherein the step of annotating includes annotating said information with an operator to transform the XML data to said second form in which the XML data is compressed according to a particular compression form that said second execution unit is able to decompress.

13. The method of claim 1, wherein said first execution unit and said second execution unit are different execution units that are executing, in parallel, work associated with servicing said request.

14. The method of claim 1, wherein said first execution unit and said second execution unit are different execution units that are each executing, on different servers of a distributed database system, work associated with servicing said request.

15. The method of claim 1, wherein the steps of detecting, generating and annotating are performed by a means that distributes work associated with servicing said request to said first execution unit and said second execution unit, and wherein said first execution unit and said second execution unit are different execution units that are each executing said work associated with servicing said request.

16. The method of claim 15, wherein said first execution unit and said second execution unit are each executing, on different data sources, said work associated with servicing said request.

17. The method of claim 15, wherein said means that distributes said work comprises an application server.

18. The method of claim 15, wherein said means that distributes said work comprises an application that manages workload among multiple means for executing said work.

19. The method of claim 1, further comprising:
   determining said second form from information that describes preferences of each of multiple execution units that performs work associated with servicing said request.

20. A non-transitory computer-readable storage medium storing one or more sequences of instructions which, when executed by one or more processors, cause performance of steps comprising:
   analyzing a query execution plan that specifies tasks to be performed by a plurality of execution units;
   wherein the plurality of execution units include a first execution unit and a second execution unit;
   wherein the query execution plan is to service a request for data;
   wherein analyzing the query execution plan includes:
      detecting that a portion of the query execution plan specifies first tasks to be performed by the first execution unit;
      detecting that another portion of the query execution plan specifies second tasks to be performed by the second execution unit; and
      detecting that, as a result of performing the first tasks, the first execution unit will generate XML data the second execution unit needs to perform the second tasks;
   generating information to send to said first execution unit to cause said first execution unit to perform first tasks;
   wherein in the absence of any annotation, said information would cause said first execution unit to generate the XML data in a first form that cannot be used by said second execution unit;
   wherein, in said first form, the XML data includes one or more references to execution unit-specific data that is accessible by the first execution unit but that is not accessible by the second execution unit; and
   annotating said information with an annotation that causes the XML data generated by said first execution unit to be transformed to a second form for use by said second execution unit in performing said second tasks;
   wherein, in said second form, the XML data does not include any references to execution unit-specific data.

21. The non-transitory computer-readable storage medium of claim 20,
   wherein the instructions that cause generating information further comprise additional instructions which, when executed, cause performance of steps comprising:
      generating information that, prior to annotating said information, would cause said first execution unit to generate the XML data in said first form that cannot be used by said second execution unit; and
   wherein said second form is different from said first form.

22. The non-transitory computer-readable storage medium of claim 21,
   wherein said first form includes information to locate data that is stored in memory that is exclusive to said first execution unit, and wherein said information to locate data stored in said memory cannot be used by said second execution unit.

23. The non-transitory computer-readable storage medium of claim 20, wherein said request for data is a database query and said query execution plan is a query plan.

24. The non-transitory computer-readable storage medium of claim 20, wherein said information is one or more database commands.

25. The non-transitory computer-readable storage medium of claim 20, wherein said annotation specifies a transformation operator.

26. The non-transitory computer-readable storage medium of claim 25, further storing additional instructions which, when executed, cause performance of steps comprising:
   executing said transformation operator, by said first execution unit, to transform the XML data generated by said first execution unit to said second form; and sending the XML data that is transformed by said first execution unit to said second execution unit in said second form.

27. The non-transitory computer-readable storage medium of claim 25, wherein said annotation specifies arguments for said transformation operator, to specify said second form.

28. The non-transitory computer-readable storage medium of claim 20, further storing additional instructions which, when executed, cause performance of steps comprising:
   transforming, by said first execution unit, the XML data to said second form based on said annotation.

29. The non-transitory computer-readable storage medium of claim 20, wherein the instructions that cause annotating further comprise additional instructions which, when executed, cause performance of steps comprising:
   annotating said information with an operator to transform the XML data to said second form in which the XML data is serialized to represent particular data for a particular XML construct and is included in a serialized image that is sent to said second execution unit.

30. The non-transitory computer-readable storage medium of claim 20, wherein the instructions that cause annotating further comprise additional instructions which, when executed, cause performance of steps comprising:
   annotating said information with an operator to transform the XML data to said second form which includes an identifier of memory space where the XML data is persistently stored, and wherein the XML data in said memory space is accessible by said second execution unit.

31. The non-transitory computer-readable storage medium of claim 20, wherein the instructions that cause annotating further comprise additional instructions which, when executed, cause performance of steps comprising:
   annotating said information with an operator to transform the XML data to said second form in which the XML data is compressed according to a particular compression form that said second execution unit is able to decompress.

32. The non-transitory computer-readable storage medium of claim 20, wherein said first execution unit and said second execution unit are different execution units that are executing, in parallel, work associated with servicing said request.

33. The non-transitory computer-readable storage medium of claim 20, wherein said first execution unit and said second execution unit are different execution units that are each executing, on different servers of a distributed database system, work associated with servicing said request.

34. The non-transitory computer-readable storage medium of claim 20, wherein the instructions that cause detecting, generating and annotating are performed by a means that distributes work associated with servicing said request to said first execution unit and said second execution unit, and wherein said first execution unit and said second execution unit are different execution units that are each executing said work associated with servicing said request.

35. The non-transitory computer-readable storage medium of claim 34, wherein said first execution unit and said second execution unit are each executing, on different data sources, said work associated with servicing said request.

36. The non-transitory computer-readable storage medium of claim 34, wherein said means that distributes said work comprises an application server.

37. The non-transitory computer-readable storage medium of claim 34, wherein said means that distributes said work comprises an application that manages workload among multiple means for executing said work.

38. The non-transitory computer-readable storage medium of claim 20, further storing additional instructions which, when executed, cause performance of steps comprising:
   determining said second form from information that describes preferences of each of multiple execution units that performs work associated with servicing said request.

39. A method for processing XML data, comprising:
   analyzing a query execution plan that specifies tasks to be performed by a plurality of execution units;
   wherein the plurality of execution units include a first execution unit and a second execution unit;
   wherein the query execution plan is to service a request for data;
   wherein analyzing the query execution plan includes:
      receiving information at the first execution unit to cause said first execution unit to perform first tasks;
      detecting that another portion of the query execution plan specifies second tasks to be performed by the second execution unit; and
      detecting that, as a result of performing the first tasks, the first execution unit will generate XML data that the second execution unit needs to perform the second tasks;
   wherein, in the absence of any annotation, said information would cause said first execution unit to generate the XML data in a first form that cannot be used by said second execution unit;
   wherein, in said first form, the XML data includes one or more references to execution unit-specific data that is accessible by the first execution unit but that is not accessible by the second execution unit;
   annotating said information with an annotation that causes the XML data generated by said first execution unit to be transformed to a second form for use by said second execution unit in performing said second tasks;
   wherein, in said second form, the XML data does not include any references to execution unit-specific data; and
   providing XML data that is annotated to said second execution unit in said second form for use in performing said second tasks by said second execution unit;
   wherein the method is performed by one or more computing devices.

40. The method of claim 39, wherein the step of transforming the XML data to said second form is performed by said first execution unit.

41. The method of claim 40, wherein the step of transforming comprises executing an operator specified in said annotation.

42. A non-transitory computer-readable storage medium storing one or more sequences of instructions which, when executed by one or more processors, cause performance of steps comprising:
   analyzing a query execution plan that specifies tasks to be performed by a plurality of execution units;
   wherein the plurality of execution units include a first execution unit and a second execution unit;
   wherein the query execution plan is to service a request for data;
   wherein analyzing the query execution plan includes:
      receiving information at the first execution unit to cause said first execution unit to perform first tasks;
      detecting that another portion of the query execution plan specifies second tasks to be performed by the second execution unit; and
      detecting that, as a result of performing the first tasks, the first execution unit will generate XML data that the second execution unit needs to perform the second tasks;
   wherein in the absence of any annotation, said information would cause said first execution unit to generate the XML data in a first form that cannot be used by said second execution unit;
   wherein, in said first form, the XML data includes one or more references to execution unit-specific data that is accessible by the first execution unit but that is not accessible by the second execution unit;
   annotating said information with an annotation that causes the XML data generated by said first execution unit to be transformed to a second form for use by said second execution unit in performing said second task;
   wherein, in said second form, the XML data does not include any references to execution unit-specific data; and
   providing XML data that is annotated to said second execution unit in said second form for use in performing said second tasks by said second execution unit.

43. The non-transitory computer-readable storage medium of claim 42, wherein the instructions that cause transforming the XML data to said second form are performed by said first execution unit.

44. The non-transitory computer-readable storage medium of claim 43, wherein the instructions that cause transforming further comprise additional instructions which, when executed, cause performance of steps comprising: executing an operator specified in said annotation.

* * * * *